United States Patent [19]

Edenhofer

[11] Patent Number: 4,609,229
[45] Date of Patent: Sep. 2, 1986

[54] VEHICLE BRAKE CONTROL SYSTEM

[75] Inventor: Berthold Edenhofer, Stuttgart, Fed. Rep. of Germany

[73] Assignee: Daimler-Benz Aktiengesellschaft, Fed. Rep. of Germany

[21] Appl. No.: 622,724

[22] Filed: Jun. 20, 1984

[30] Foreign Application Priority Data

Jun. 20, 1983 [DE] Fed. Rep. of Germany ....... 3322098

[51] Int. Cl.⁴ ............................................. B60T 8/14
[52] U.S. Cl. .................................. 303/6 C; 303/24 C
[58] Field of Search ................... 303/6 C, 22 R, 24 R, 303/24 A, 24 C, 24 F

[56] References Cited

U.S. PATENT DOCUMENTS 3,888,546 6/1975 Stordahl ....................... 303/24 C X

FOREIGN PATENT DOCUMENTS 2008025 9/1970 Fed. Rep. of Germany .
2736095 6/1978 Fed. Rep. of Germany .
2535268 5/1984 France .
2069643 8/1981 United Kingdom .

*Primary Examiner*—Duane A. Reger
*Attorney, Agent, or Firm*—Barnes & Thornburg

[57] ABSTRACT

A control valve is provided to control the rear axle brake pressure in response to vehicle loading and deceleration. This control valve reduces the rear axle brake pressure relative to the system pressure $P_S$ present at the input side of the control valve whenever the system pressure exceeds a threshold value. The control valve is provided with a control piston therein having an additional active surface thereon. This active surface can be subjected to the pressure $P_a$ via a connection to the control valve input pressure. A seat-controlled valve is located within this connection and exerts a closing force to seal off the connection depending on the deceleration of the vehicle.

18 Claims, 11 Drawing Figures

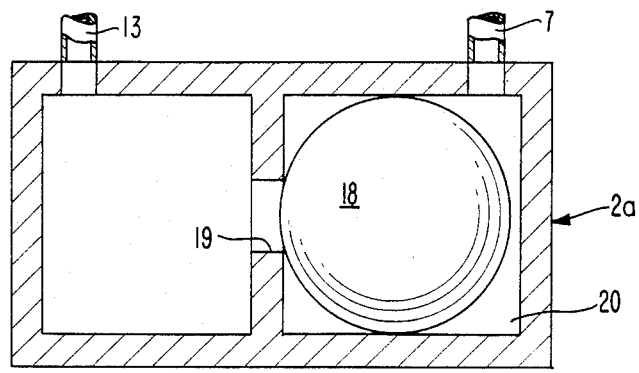
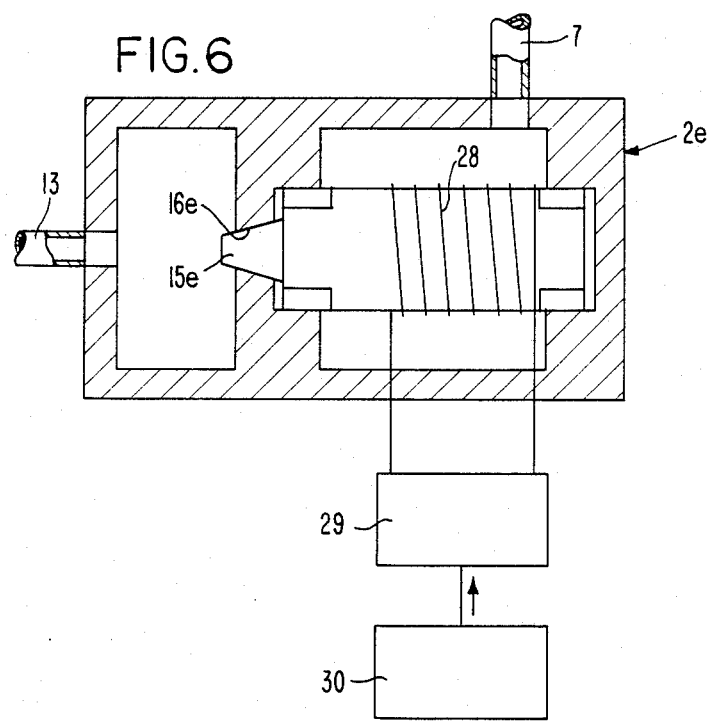

VEHICLE BRAKE CONTROL SYSTEM

BACKGROUND AND SUMMARY OF THE INVENTION

The present invention relates generally to a device for load dependent control and/or limitation of the braking forces of hydraulic of pneumatic vehicle brakes, and more particularly, to such brake control systems on the rear wheels of road-going utility vehicles.

Because of legal requirements and regulations, it is necessary to vary the rear wheel braking forces on utility vehicles as a function of the vehicle load and to efficiently utilize the varying adhesion conditions between the tires and the road surface. It is necessary to avoid, as far as possible, undesirable overbraking and underbraking of the rear wheels relative to the front wheels. If the rear wheels are braked too strongly (overbraking), they may lock prematurely and cause a tail slide to occur. If the rear wheels are braked too softly (underbraking), the front wheels can lock prematurely and cause the vehicle to become unsteerable.

One such device directed to this problem is known from German Unexamined Published Application (DE-OS) No. 23 40 916. In this arrangement, the valve affected by inertial forces is held open by a spring during moderate deceleration so that the additional active surface located directly on the control piston is substantially subject to the pressure applied on the input side of the control valve. With this connection, possible throttling losses can be neglected. During stronger deceleration of the vehicle, the control valve is closed due to the force of a heavy body arranged to be movable in the longitudinal direction of the vehicle. Since the valve is so arranged that its closing pressure is increased with increasing input side pressure, the pressure acting on the additional active surface is, therefore, locked in during the closing of the valve. Hence, this pressure remains substantially constant as long as the valve remains in the closed condition.

Although the threshold value of valve closing is changed as a function of vehicle load in this device, the proportionality between the pressure existing at the output side of the control valve and the pressure existing at the input side of the control valve cannot be altered. Diagramatically, this relationship of the pressure existing at the output side of the control valve (usually the pressure existing at the rear wheel brakes) as a function of the pressure existing at the input side of the control valve, for a plurality of different vehicle load conditions, can be shown as a family of characteristic lines. Typically, each such line consists of a more or less long first section having a large slope starting from the origin and is continued by a second section with a smaller slope. The first sections all have the same slope with respect to one another, and likewise the second sections all have the same slope with respect to one another.

This is not an optimum arrangement to the extent that it only gives an extraordinarily incomplete approximation of the shape of an ideal characteristic diagram. Such an ideal diagram consists of a family of hyperbola having the same slope at the origin. It follows that frequent overbraking or underbraking of the rear wheels is to be expected whenever the loading condition of the vehicle deviates from a value which is optimum in terms of braking characteristics of a particular control system.

In this respect, the devices known from German Unexamined Published Applications (DE-OS) Nos. 25 22 929 and 30 19 630 also fail to provide an ideal solution. The design of these devices is similar to that shown in German Unexamined Published Application (DE-OS) No. 23 40 916, mentioned above. The primary difference between these latter two designs and the above-mentioned design consists substantially in the fact that the additional active surfaces are located on separate pistons which are connected to the control pistons of the control valves by means of spring arrangements. These spring arrangements are clamped between the additional pistons and the control pistons. The hydraulic or pneumatic pressure acting on the additional active surfaces operates indirectly, therefore, rather than directly on the control pistons. The additional pistons are also being displaced, and the spring arrangements are subjected to an alteration in tension. The principles of operation do, however, correspond to that of the device shown in German Unexamined Published Application (DE-OS) No. 23 40 916.

A pressure control device for a vehicle brake installation is also shown in German Unexamined Published Application (DE-OS) No. 25 02 265. In this device, the control piston can be subjected to an additional force by means of an additional piston arrangement and an inertia pendulum reacting to deceleration of the vehicle. This additional force is dependent upon the vehicle deceleration and the difference between the pressure existing between the input side of the control valve and the pressure existing at the output side of the control valve. However, the inertia pendulum is located as a force transmission element between the control piston and the additional piston arrangement. Thus, the inertia pendulum itself reacts to the differential pressure so that oscillations of the pendulum can have an undesirable influence on the operation of the control valve. Further, the inertia of pendulum has other adverse influences on the operation of the control valve.

It is therefore an object of the present invention to provide a brake control system which prevents undesirable overbraking and underbraking of the rear wheels relative to the front wheels.

Another object is the provision of an improved brake control system wherein a change in the proportionality between the increase in the output side pressure and the increase in the input side pressure as a function of the vehicle load can be attained with good reproducibility in a simple constructional manner.

These and other objects of the present invention are attained in the provision of a control valve upstream of the brakes and having therein a control piston arranged as a valve body. This control piston is subjected to hydraulic or pneumatic pressure applied to the input side of the control valve and/or to mechanical preloading in the opening direction and to hydraulic or pneumatic pressure applied to the output side of the control valve in the closing direction. Mechanical preloading can be provided by a spring means. The output side of the control valve may lead directly to the brake means. In this way, the control valve limits the output side pressure relative to the input side pressure above a load dependent threshold value of the input side pressure. To achieve load dependent control of the threshold value at the control piston or at a part with a drive connection to the control piston, an additional active surface is subject to pneumatic or hydraulic pressure via a pneumatic or hydraulic connection branching off from the input pressure side line. A valve is located in this connection which can be effected by inertia forces during deceleration of the vehicle in order to control the production of forces acting to open the control valve and permit pressure flow to the brakes. This valve arrangement which can be influenced by inertia forces is generally referred to herein as a seat-controlled valve and reduces the pressure to the additional active surface on the output side of this valve arrangement as a function of the vehicle deceleration dependent closing pressure of the seat-controlled valve relative to the input side pressure.

Therefore, the seat-controlled valve can be opened under the influence of the input side pressure if the input side pressure exceeds the pressure acting on the additional active surface by a sufficiently large amount, i.e., if the input side pressure exceeds the pressure acting on the additional active surface at least by the amount of the closing pressure of the seat-controlled valve. This closing pressure is a function of the vehicle deceleration forces. The pressure acting on the additional active surface increases correspondingly with increasing input side pressure. The proportionality factor between the input side pressure and the pressure acting on the additional active surface depends on the vehicle loading because of the relationship between the vehicle deceleration and the input side pressure. Therefore, the relationship between the vehicle deceleration and the closing pressure of the seat-controlled valve depends on the vehicle loading.

Diagramatically, the present invention permits a much better approximation to the theoretical optimum relationship between the output side pressure and the input side pressure at various loading conditions.

The vehicle deceleration dependent closing pressure of the seat-controlled valve is attained, in the simplest case, in a valve body which is designed as a heavy body movable in a longitudinal direction of the vehicle between open and closed positions. This permits different inertial forces occurring at different decelerations to be utilized to produce a change in the closing pressure of the seat-controlled valve proportional to the vehicle deceleration.

In an alternate embodiment of the present invention, the seat-controlled valve can also have a light valve body which can be directly or indirectly loaded in the closing direction by a heavier body which is movably located in the vehicle longitudinal direction. This construction provides the advantageous possibility of including a spring element between the light valve body and the heavy body so that during opening and closing movements of the valve body only small inertia forces arise, due to the low mass of the valve body. Thus, the heavy body acts only as a load on the light valve body, but has no influence on the inertia of that valve body. By this means, opening and closing movements are possible in extremely rapid succession, if so required in a given brake control system.

The vehicle deceleration dependent closing forces can also be produced by an electrical control. For example, an electromagnetic coil may be employed. Such an arrangement is particularly advantageous when an actual value sensor is already provided on the vehicle, for example, in anti-brake locking systems, which records the changes in the rotational speed of the wheels and generates a deceleration-dependent signal which can be used for controlling the closing forces.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIGS. 2-7 show partial cross-sectional views of various alternative embodiments of the seat-controlled valve according to the principles of the present invention.

DETAILED DESCRIPTION OF THE DRAWINGS

Figure 1:
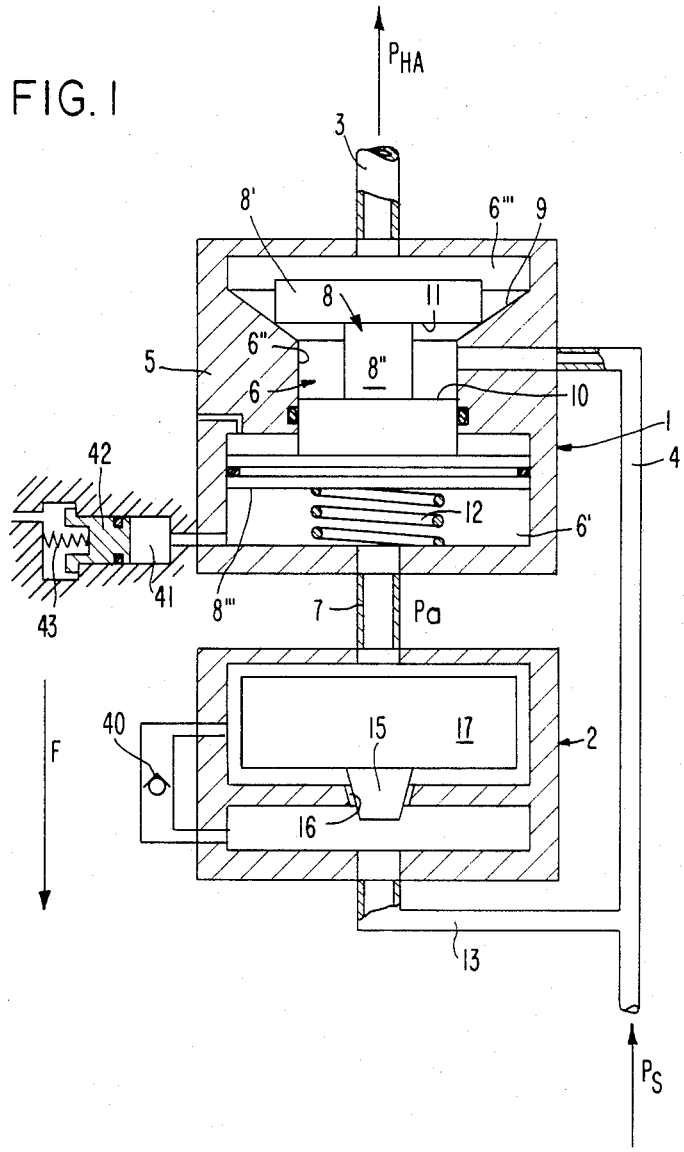
FIG. 1 shows a partial cross-sectional view of a vehicle brake control system embodying the principles of the present invention.

FIG. 1, which illustrates a preferred embodiment of the present invention, shows a vehicle brake control system for regulating and/or limiting the braking forces as a function of vehicle load. This control system includes a control valve 1 and a seat-controlled valve 2, which influences the control behavior of control valve 1 in a manner shown in further detail below.

On the input side, control valve 1 has a fluid connection, via an input pipe or pressure line 4, to a controllable pressure source, such as the main brake cylinders (not shown). On the output side, control valve 1 has a fluid connection, via an output pipe or pressure line 3, to one or more rear wheel brakes or their wheel brake cylinders (not shown).

The control valve 1 has a housing 5 with a cylindrical bore 6 therein which is connected, at one axial end region 6', to output pipe 3 and, at another axial end region 6''', to a connection pipe 7 which leads to the seat-controlled valve 2. Axial end regions 6' and 6''' of the bore 6 have an increased diameter, relative to the central region 6'' of this bore 6. End region 6' of the bore, connected to connection pipe 7, has a transition to narrower central region 6'' with the formation of a step. End region 6''' of the bore, connected to output pipe 3, has a transition to narrower central region 6'' with the formation of a conical seat 9. The connection of input pipe 4 enters radially into narrower central region 6''.

Located within the bore 6 is a multiple-step control piston 8. One end of control piston 8 (the lower end in FIG. 1) has a larger diameter and is in sliding engagement with region 6' of bore 6. The adjacent region of the piston 8 (continuing upwards in FIG. 1) has sliding engagement with central region 6'' of bore 6. Continuing in the upper direction of FIG. 1, control piston 8 has a narrowed region 8''. Thus, an annular space, connected to the input pipe 4, is formed within region 6'' of bore 6. Adjacent to this narrowed section, control piston 8 is provided with a closing plate 8' which engages conical seat 9 when in its closed position and is spaced apart from conical seat 9 when in its opened position. Closing plate 8' controls the connecting fluid path between input pipe 4 and output pipe 3.

Annular surface 10 concentrically continues from the lower end of narrowed region 8" of control piston 8. The outer diameter of annular surface 10 corresponds to the diameter of central section 6" of bore 6. Opposite annular surface 11 concentrically continues from the upper end of narrowed region 11 on the closing plate 8' and has a greater area than annular surface 10. Whenever the control piston 8 is in the closed position, the fluid pressure in the annular space between annular surfaces 10 and 11 therefore attempts to force the control piston 8 toward the opened position (upwards in the drawing), i.e., this fluid pressure exerts a force in the opening direction.

In the embodiment shown in FIG. 1, control piston 8 is in engagement with a spring 12 which biases control piston 8 in the opening direction. Spring 12 is disposed in end region 6' of bore 6 and engages additional active surface 8''' which is provided on the lower end of control piston 8.

Seat-controlled valve 2 is connected between branch 13 of input pipe 4 and connection pipe 7. The connecting pressure flow path between branch 13 and connection pipe 7 is controlled by means of a conical valve body 15 acting together with a corresponding conical valve seat 16 within seat-controlled valve 2. Located on valve body 15 is a heavy body 17 which increases the effective inertia mass of valve body 15 and, together with the latter, is movable in the vehicle longitudinal direction. Movement of these bodies in the direction of travel indicated by arrow F corresponds to the closing movement, restricting or preventing flow to connection pipe 7. Movement in the opposite direction opens the connecting path between the branch 13 and the connection pipe 7 to a greater or lesser extent depending on the extent of such movement.

Pressure through connection pipe 7 to control valve 1 is applied to additional active surface 8''' in end region 6' of bore 6. If the vehicle is braked, i.e. decelerated, heavy body 17 attempts to push valve body 15 against valve seat 16 with a force proportional to the deceleration. Thus, the closing pressure of seat-controlled valve 2 depends on the deceleration of the vehicle. Depending on the closing pressure of seat-controlled valve 2, the pressure in connection pipe 7, which represents the output of seat-controlled valve 2, is reduced relative to the pressure present in the branch 13, which represents the input side of seat-controlled valve 2.

Briefly, the device shown operates as follows:

At the beginning of braking, control piston 8 is located in its opened position so that the rear axle brake pressure $P_{HA}$ present in output pipe 3 corresponds to the system pressure $P_S$ existing in input pipe 4. In connection pipe 7, there is a pressure $P_a$ which is more or less greatly reduced relative to the system pressure $P_S$, depending on the strength of the closing pressure on seat-controlled valve 2. The pressure $P_a$ acts on lower (in FIG. 1) large active surface 8''' of control piston 8 and attempts to force the control piston upward in the opening direction or to hold it in the opened position.

When the system pressure $P_S$ becomes sufficiently large (by increased operation of the brakes), control piston 8 moves downward into the closed position against the biasing force spring 12 and the pressure $P_a$ acting on the lower large active surface 8''' of the control piston 8. This closing motion of control piston 8 is caused, at least in part, by the reduction of $P_a$ relative to $P_S$, when seat-controlled valve 2 reduces pressure flow therethrough from input line 4, and the inertia force acting directly on control piston 8. Thus, the control valve 1 switches over. With a further increase in the system pressure $P_S$, control piston 8 opens and closes in rapid succession. Thus, the rear axle brake pressure $P_{HA}$ is reduced relative to the system pressure $P_S$ in the process. The amount of the reduction, and hence the ratio between the rear axle brake pressure $P_{HA}$ and the system pressure $P_S$, then depends on both the pressure $P_a$ and the diameters of closing plate 8', central region 6" of bore 6, and additional active surface 8''' of control piston 8.

As a result, the following physical relationships apply:

As long as control valve 1 has not switched over, i.e., as long as control piston 8 remains continuously in its open position:

$$P_{HA} = P_S$$

After switching over occurs, i.e. whenever the system pressure $P_S$ exceeds a threshold value:

$$P_{HA} = K_1 P_S + K_2$$

where $K_1$ and $K_2$ are costants with, in addition to other parameters determined by the design, depend on the vehicle mass, the mass of heavy body 17 and (only in the case of $K_2$) on the force of spring 12.

Figure 10:
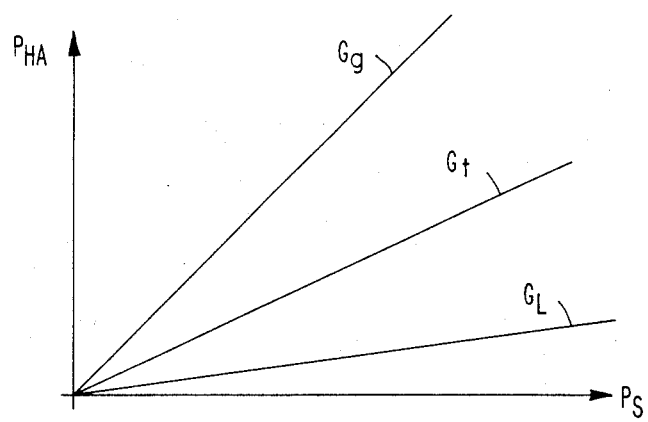
FIGS. 10 and 11 illustrate diagramatically the input versus output pressure relationships as a function of vehicle loading on alternative embodiments of the present invention.
Figure 11:
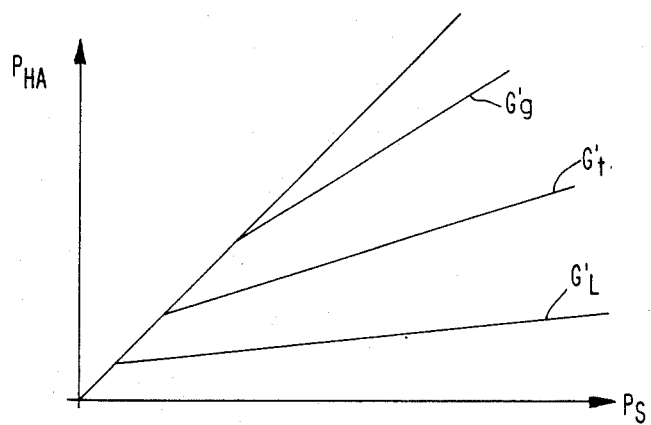

The qualitative relationships shown in FIGS. 10 and 11 arise between the rear axle brake pressure $P_{HA}$ and the system pressure $P_S$.

FIG. 10 shows the relationships which occur if spring 12 (see FIG. 1) has a negligible force or is not installed. In this case, control valve 1 switches over even at quite small system pressures $P_S$ and correspondingly reduces the rear axle brake pressure $P_{HA}$ relative to the system pressure $P_S$. Curve $G_L$ shows the relationship for the empty vehicle. Curve $G_T$ shows that for the partially loaded vehicle curve $G_g$ shows the relationship for the fully loaded vehicle. The varying reduction of the rear axle brake pressure $P_{HA}$ relative to the system pressure $P_S$ is attributable to the fact that with the less loaded vehicle, quite a high deceleration is attained even at relatively low system pressures $P_S$. Thus, the closing pressure of the seat-controlled valve 2 is large and, correspondingly, the pressure $P_a$ in connection pipe 7 (see FIG. 1) is greatly reduced relative to the system pressure $P_S$. This results in only relatively small forces acting on the control piston 8 in the opening direction.

In the case of a very weak spring 12 or in the absence of such a spring, a so-called spoke diagram occurs, as shown in FIG. 10.

With a stronger spring 12, a characteristic diagram as in FIG. 11 appears. This is referred to as a kinked spoke diagram. In this circumstance, rear axle pressure $P_{HA}$ and the system pressure $P_S$ initially have approximately the same values until control valve 1 switches over. With a further increase in the system pressure $P_S$, the rear axle brake pressure $P_{HA}$ is reduced relative to the system pressure $P_S$. Curves $G'_L, G'_t$ and $G'_g$ then give the relationship for empty, partially loaded, and fully loaded vehicles, respectively. Each of these curves has a different slope after control valve 1 switches over.

FIGS. 2 to 6 show alternative embodiment forms of the seat-controlled valve 2 of the present invention.

Seat-controlled valve 2a of FIG. 2 differs from the embodiment of FIG. 1 essentially in that the valve body and the heavy body are formed in common as a heavy ball 18 which acts together with an annular valve seat 19. Ball 18 is movable in the travel direction of arrow F within a recess 20, having a polygonal cross-section, in housing 21 of seat-controlled valve 2a. The polygonal cross-section ensures a passage through the recess 20 between the opening enclosed by the valve seat 19 and the opening to connection pipe 7 when the ball 18 is lifted from the valve seat 19.

Figure 3:
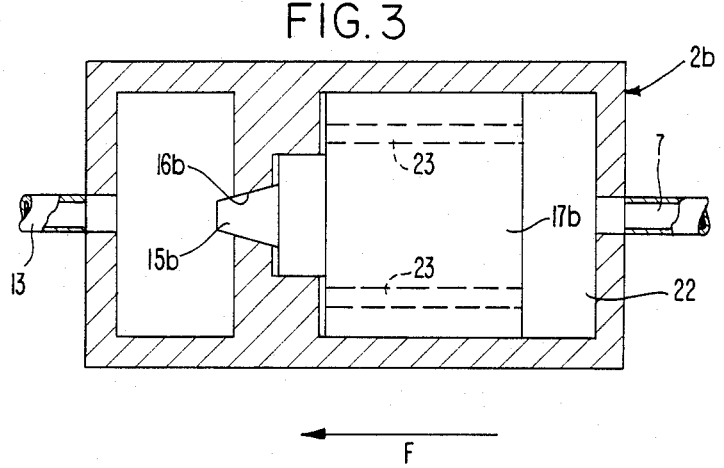

Seat-controlled valve 2b in accordance with FIG. 3 has a valve body 15b which is separable from heavy body 17b and can be displaced in the travel direction of arrow F in a recess 22 of the valve housing. Bores 23 form a passage between the opening enclosed by valve seat 16b and the connection to connection pipe 7 when valve body 15b lifts from seat 16b.

Figure 4:
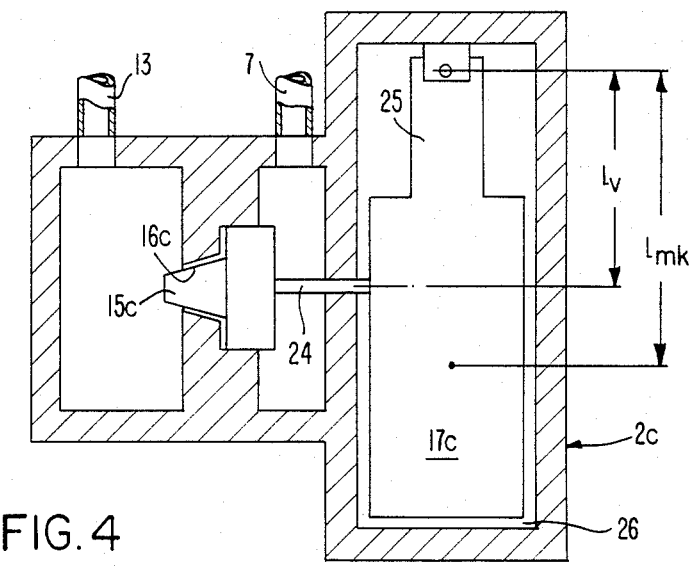

In the embodiment of seat-controlled valve 2c of FIG. 4, heavy body 17c is located on a pendulum 25 so that it can oscillate in the direction of travel of arrow F in a chamber 26. Heavy body 17c loads valve body 15c by means of a push rod 24 therebetween. This push rod passes through a wall of chamber 26 in an opening provided for it. The arrangement is such that the center of gravity of heavy body 17c is located at a relatively large distance $L_{mk}$ from the pendulum axis while pendulum 25 and heavy body 17c act with a relatively short lever arm $L_v$ on push rod 24. By this means, a mechanical advantage is obtained which produces relatively large closing forces during movement of the pendulum 25 in the travel direction even with a relatively small mass of heavy body 17c.

Figure 5:
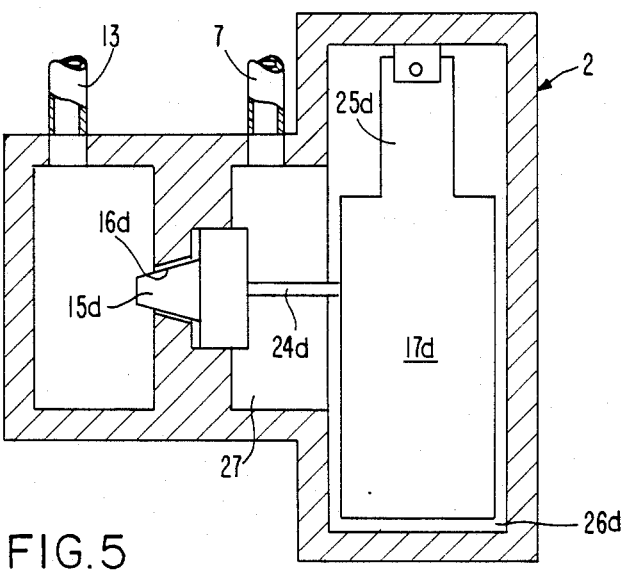

The embodiment of seat-controlled valve 2d of FIG. 5 differs from that of FIG. 4 only in that pendulum 25d and chamber 26d, which contains heavy body 17d, form a part of the output chamber 27, connected to connection pipe 7.

In the embodiment of seat controlled valve 2e of FIG. 6, valve body 15e forms the core of an electromagnetic coil 28. This magnetic coil is subjected to differing voltages by means of a control and amplifier unit 29. These voltages depend on the output signal of a deceleration sensor 30 which is connected to the input side of control and amplifier unit 29. In this arrangement, the closing pressure of the valve body 15e is controllable, depending on the vehicle deceleration, in accordance with any given function. In the simplest case, the closing pressure and the deceleration are typically mutually proportional, as is also the case in the embodiments of the seat-controlled valves shown in FIGS. 1 to 5.

Figure 7:
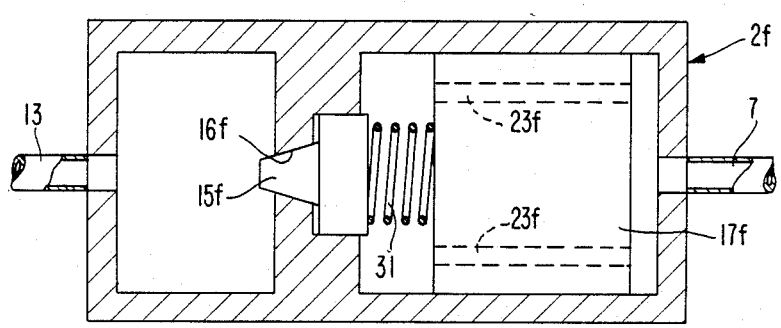

Seat-controlled valve 2f shown in FIG. 7 corresponds generally to the embodiment shown in FIG. 3, except that a spring 31 is clamped between valve body 15f and heavy body 17f. This spring permits movement of valve body 15f relative to heavy body 17f. By this means, valve body 15f can execute opening and closing movements without heavy body 17f being noticeably moved; the mass of the latter does not therefore increase the inertia of valve body 15f.

Figure 8:
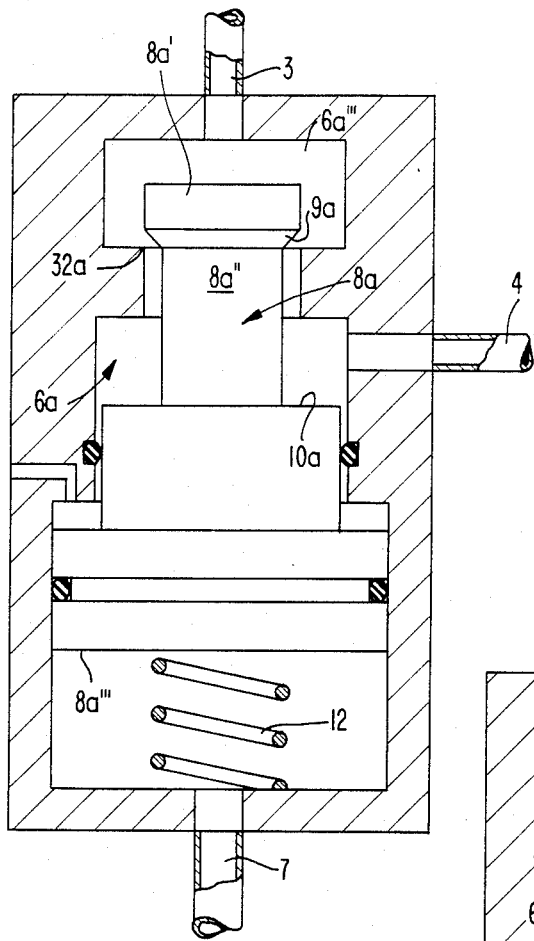
FIGS. 8 and 9 show partial cross-sectional views of various alternative embodiments of the control valve according to the principles of the present invention.
Figure 9:
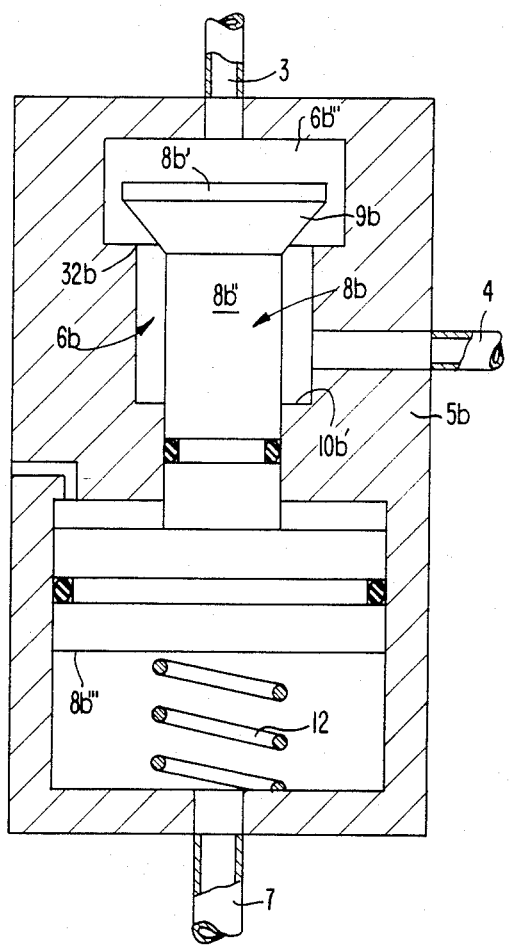

FIGS. 8 and 9 show alternative embodiments of the control valve according to the principles of the present $8a''$ of control piston 8a along conical section 9a. If control piston 8a is in its closed position, the system pressure $P_S$ existing in inlet pipe 4 correspondingly attempts to hold control piston 8a in its closed position. Control piston 8a can, correspondingly, only leave this closed position if the pressure $P_a$ becomes sufficiently large and, thus, acts on active surface $8a'''$ to move control piston 8a upward.

As shown in FIG. 9, annular space 6b, in contrast to the embodiment shown in FIG. 1, is limited at its end remote from closing plate 8b' by an annular surface 10b formed as part of housing 5b. If control piston 8b is in the closed position, the pressure on the annular cross-section between the seat 32b and narrowed region $8b''$ of control piston 8b along conical section 9b causes control piston 8b to be biased in the direction of opening.

In order to permit relief of pressure at the active surface $8'''$, particularly at the end of the braking action, a non-return valve 40 is located, as shown in FIG. 1, in parallel to seat-controlled valve 2. This non-return valve permits flow from connection pipe 7 to branch 13 but prevents flow in the reverse direction. A non-return valve 40 of this type can, if desired, also be located within valve body 15.

In addition, a bore 41 is located on control valve 1 at end region 6' of bore 6. A piston 42 is movably located within bore 41 and is sealed by means of a ring seal against the wall of bore 41. The left-hand side, in FIG. 1, of this piston 42 is biased by a spring 43. Piston 42 can, depending on the magnitude of the pressure $P_a$, move to the left to a greater or lesser extent against the force of spring 43. Piston 42 serves to prevent pressure peaks whenever control piston 8 executes movements in the opening or closing direction. Such pressure peaks could appear, in particular, if hydraulic, i.e., non-compressible, media are used as the pressure transmitting media. If, on the other hand, the device shown operates pneumatically, i.e., with compressible pressure transmitting media, the pressure peaks mentioned are substantially smaller so that the provision of the piston 42 may become unnecessary in some embodiments.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A device for the load dependent control of the fluid pressure braking forces of vehicle brakes, comprising:
   control valve means upstream of the brakes, having an input and an output side connected to fluid pressure,
   control piston means within said control valve means, arranged as a valve body movable in an opening and a closing direction and subjected to fluid presan additional active surface at said control piston means;

means for load dependent control of said threshold value at one of said control piston means, and means with a drive connection to said control piston means, by subjecting said additional active surface to fluid pressure via a fluid connection branching off from said input side and;

seat-controlled valve means, provided in said fluid connection, for being affected by inertia forces during deceleration of said vehicle in order to product forces on said control piston means in said opening and closing directions in order to increase said output side pressure relative to said input side pressure by closing off said fluid connection and thereby reducing the pressure, to which said additional active surface is subjected, on the output side of said seat-controlled valve means, relative to said input side pressure, as a function of the vehicle deceleration;

whereby the output pressure is a function of variables including the input pressure and the position of the control piston means, which is controlled by the pressure supplied via the fluid connection branching off from said input side.

2. The device in accordance with claim 1, wherein the closing force of said seat-controlled valve means is approximately proportional to said vehicle deceleration.

3. The device in accordance with claim 1, wherein said seat-controlled valve means includes a valve body having a heavy body movable in the vehicle longitudinal direction between open and closed positions with respect to said fluid connection in order to utilize the inertia forces occurring during vehicle deceleration to open or close off that connection.

4. The device in accordance with claim 1, wherein said seat-controlled valve means has a light closing body which can be directly or indirectly biased, in a closed position with respect to said fluid connection, by means of a heavy body movable in the vehicle longitudinal direction, in order to utilize the inertia forces occurring during vehicle deceleration to close off that connection.

5. The device in accordance with claim 3, wherein a spring element is located between said valve body and said heavy body.

6. The device in accordance with claim 4, wherein a spring element is located between said closing body and said heavy body.

7. The device in accordance with claim 3, wherein said heavy body is arranged as a pendulum movable in the direction of travel of said vehicle.

8. The device in accordance with claim 4, wherein said heavy body is arranged as a pendulum movable in the direction of travel of said vehicle.

9. The device in accordance with claim 7, wherein the distance between the pendulum axis and the center of gravity of said pendulum is larger than the distance between the pendulum axis and the connecting point of the closing body on said pendulum.

10. The device in accordance with claim 1, wherein the closing force of said seat-controlled valve relative to said fluid connection is electrically controllable.

11. The device in accordance with claim 10, wherein said closing force is produced by means of an electromagnetic coil which is subjected to variable voltage.

12. The device in accordance with claim 1, wherein said mechanical preloading means includes spring means applied to said additional active surface.

13. A device for controlling braking fluid pressures applied to vehicle brakes as a function of vehicle load, comprising:

control valve means connected between an input pressure line and an output pressure line;

control piston means within said control valve means, responsive at least to input pressure from said input pressure line for controlling the flow of said input pressure to said output pressure line such that said flow of said input pressure to said output pressure line is restricted when said input pressure exceeds a predeterminable threshold level for a given vehicle load;

means for controlling said threshold level as a function of said vehicle load and including an additional active surface formed on said control piston and having fluid pressure applied thereto from said input pressure line; and seat-controlled valve means, connected between said additional active surface and said input pressure line, for controlling the flow of said input pressure to said additional active surface and including therein valve body means responsive to inertia forces arising during deceleration of said vehicle for restricting the flow of said input pressure to said additional active surface;

whereby the output pressure is a function of variables including the input pressure and the position of the control piston means which is controlled by the pressure supplied via a fluid connection branching off from said input side to said additional active surface via the seat-controlled valve means.

14. The device according to claim 13, wherein said control piston is also responsive to mechanical biasing provided by spring means applied to said additional active surface and biasing said control piston to permit flow of said input pressure to said output pressure line.

15. The device according to claim 13, wherein said control piston is further responsive to said input pressure such that said control piston periodically permits flow of said inlet pressure to said output pressure line when said inlet pressure exceeds a second threshold level above said predetermined threshold level.

16. The device according to claim 13, wherein said additional active surface is slidably received in a bore region having pressure relief means connected thereto.

17. The device according to claim 13, wherein said seat-controlled valve means includes a valve seat and a valve body engageable therewith to restrict fluid pressure flow to said additional active surface, and further including heavy body means biasing said valve body into engagement with said valve seat when vehicle deceleration exceeds a predetermined level.

18. The device according to claim 17, wherein said heavy body means includes pressure relief means therein.

* * * * *

UNITED STATES PATENT AND TRADEMARK OFFICE
CERTIFICATE OF CORRECTION

PATENT NO. : 4,609,229

DATED : Sep. 2, 1986

INVENTOR(S) : Berthold Edenhofer, Stuttgart, Fed. Rep. of Germany

It is certified that error appears in the above-identified patent and that said Letters Patent is hereby corrected as shown below:

Column 9, Line 12: change "product" to "produce".

Signed and Sealed this

Seventh Day of April, 1987

Attest:

DONALD J. QUIGG

*Attesting Officer*   Commissioner of Patents and Trademarks